L. D. MILLS.
APPARATUS FOR REMOVING GASES FROM LIQUIDS.
APPLICATION FILED APR. 19, 1919.
1,433,965.
Patented Oct. 31, 1922.
3 SHEETS—SHEET 1.
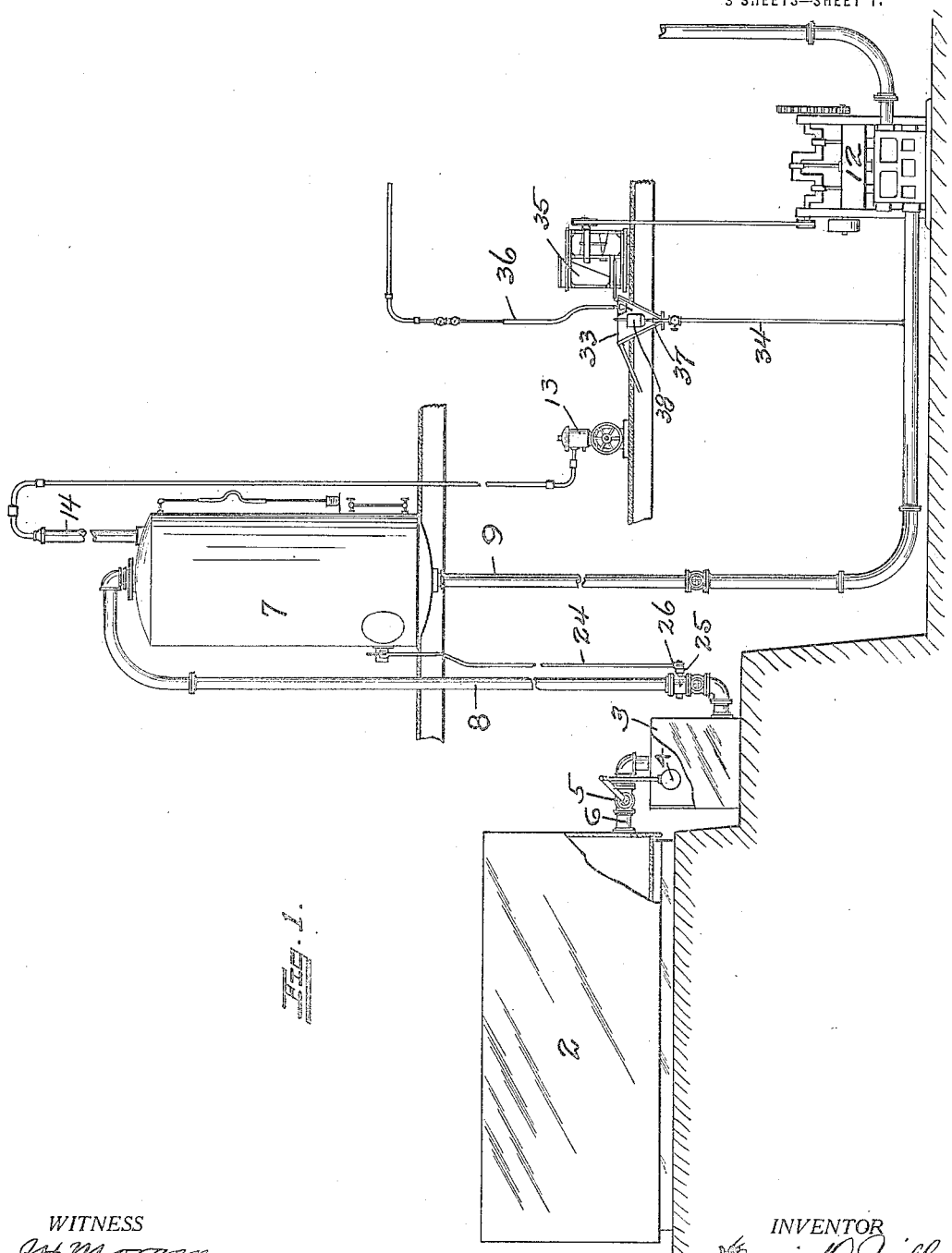
WITNESS
J H Morgan
INVENTOR
Louis D. Mills
BY Archibald Cox
his ATTORNEY

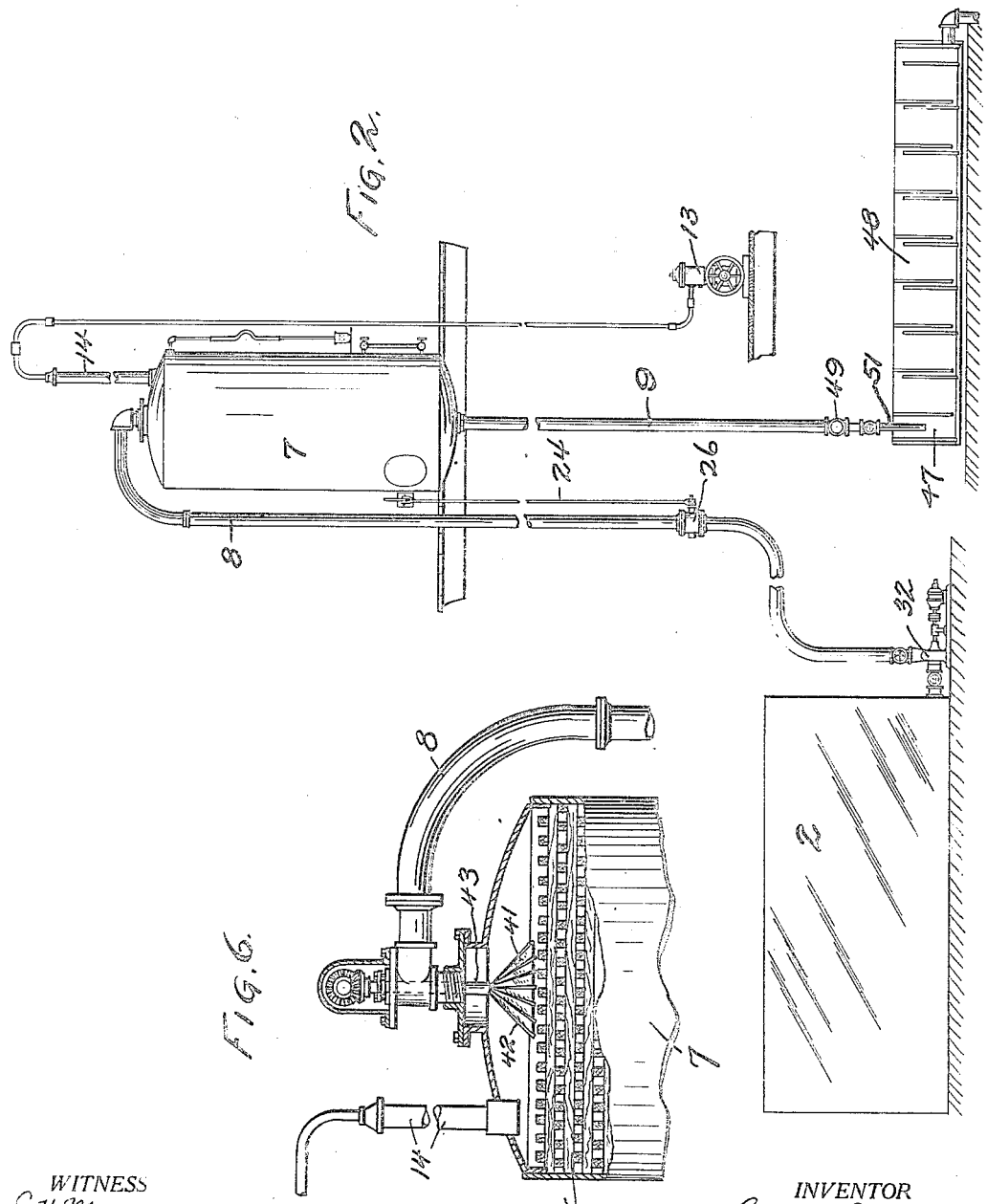

L. D. MILLS.
APPARATUS FOR REMOVING GASES FROM LIQUIDS.
APPLICATION FILED APR. 19, 1919.
1,433,965.
Patented Oct. 31, 1922.
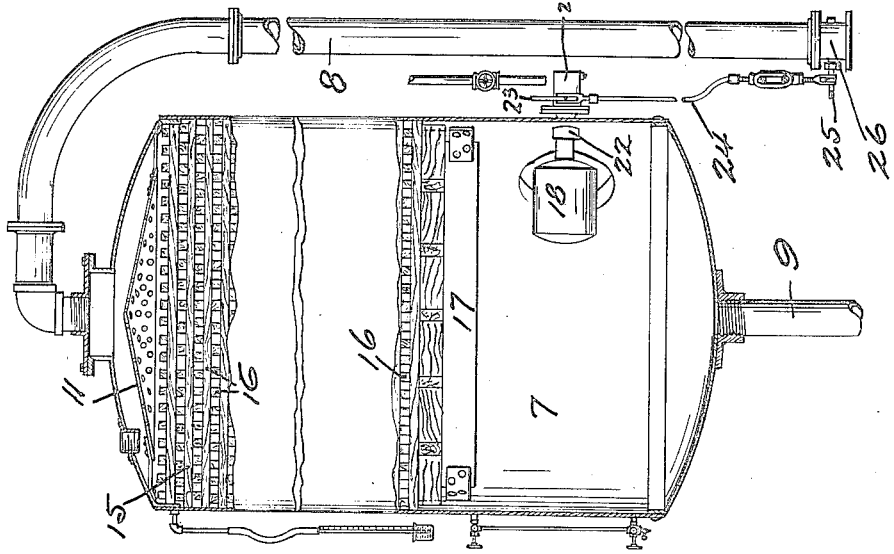
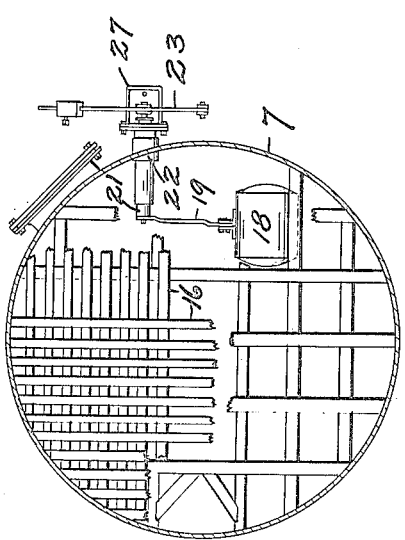
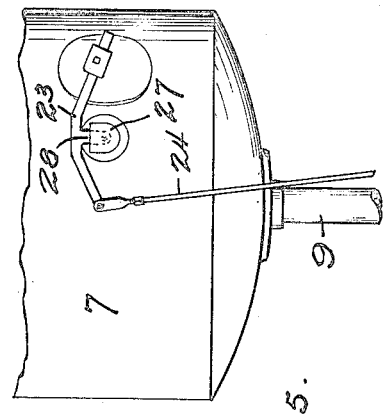

Patented Oct. 31, 1922.

1,433,965

UNITED STATES PATENT OFFICE.

LOUIS D. MILLS, OF SAN FRANCISCO, CALIFORNIA, ASSIGNOR TO THE MERRILL COMPANY, OF SAN FRANCISCO, CALIFORNIA, A CORPORATION OF CALIFORNIA.

APPARATUS FOR REMOVING GASES FROM LIQUIDS.

Application filed April 19, 1919. Serial No. 291,290.

*To all whom it may concern:*

Be it known that I, LOUIS D. MILLS, a citizen of the United States, and a resident of San Francisco, in the county of San Francisco and State of California, have invented certain new and useful Improvements in Apparatus for Removing Gases from Liquids, of which the following is a specification.

The present invention relates to an improvement in apparatus for removing dissolved gases from liquids, and especially from flowing streams of liquids.

It has been found in performing various chemical and metallurgical operations, for example, in the treatment of ores by the cyanide process, that it is advantageous at certain stages in the process to remove from the solutions being treated the gases entrained and/or dissolved therein. Where the solutions being treated are flowed in a continuous stream, it is desirable to continuously remove the gases from the stream. The chief object of the present invention is to improve upon the construction and arrangement of the parts of an apparatus for removing entrained and/or dissolved gases from liquids, such as cyanide solutions, to the end that the apparatus may perform its functions more efficiently than is possible in the forms of apparatus heretofore employed for this purpose. In effecting this object the apparatus is provided with means for causing the liquid to be split up or divided into films of extreme tenuity, in which state the surface tension of the liquid is most easily ruptured, whereby the dissolved gases are most thoroughly and efficiently removed. It is found by extensive experiments carried on over a considerable period of time that when the liquid is thus spread into thin films the efficiency of de-aeration is much higher than when the liquid is otherwise finely-divided, as being sprayed or reduced to drops or thin streams. A further object of the invention is to provide an apparatus of this character with means for controlling the flow of the solution through the apparatus, while at the same time maintaining a high vacuum—as close as possible to the maximum obtainable—in the vacuum chamber, where the solution is subjected to the action of the vacuum. These objects and such other objects as shall hereinafter appear and be pointed out as the description proceeds, are accomplished in the improved apparatus for removing gases from liquids described and claimed in the following specification:—

In the accompanying drawings illustrating the preferred form in which the invention is at present embodied, Fig. 1 is a side elevation of the improved appaatus for removing gases from liquids, certain parts thereof being broken away to disclose the interior construction and other parts being removed to reduce the size of the Figure; Fig. 2 is a view similar to Fig. 1 of a modified form of apparatus; Fig. 3 is a cross-section of the upper end of the receiver showing the construction of the checker-work; Fig. 4 is a sectional elevation of the receiver on an enlarged scale; Fig. 5 is an elevation of the lower portion of the receiver as shown in Fig. 4; and Fig. 6 is a sectional elevation of the upper end of a modified form of receiver.

In the illustrated embodiment of the invention, the apparatus is shown in a form particularly adapted for removing the entrained and/or dissolved gases from metal-bearing cyanide solutions prior to bringing the solution into contact with a precipitant. When metals or materials are precipitated from solutions by a precipitant, such as zinc or zinc dust, it has been found that the presence of oxidizing gases in the solutions and/or the contact of the air or other oxidizing gases with the mixture of solution and precipitant interferes with precipitation, causing a decrease in the efficiency of precipitation and an increase in the amount of precipitant which must be used. The apparatus of this invention is for removing the gases from the solution and preventing reabsorption of oxidizing gases for the purpose of overcoming the effects thereof on the precipitating action. It will be understood, however, that the invention is not to be restricted to this particular purpose and arrangement of apparatus, but is adapted with but slight or no change for removing gases from various kinds of liquids, where it is found desirable to do so.

The preferred form of the invention as shown in Figs. 1 and 4 will first be described and then the modified forms thereof will be described. The pregnant solution, after separation from the ore and after clarification, is flowed into the storage or stock tank 2. From the tank 2 the solution passes into the steady-head tank 3, which is provided with a float 4 arranged to operate a valve 5 in a pipe 6 through which the solution passes from the tank 2 into the tank 3. From the tank 3 the solution is conducted into a vacuum chamber or receiver 7 through a feed pipe 8 connected with the lower part of the tank 3 and with the upper part of the receiver 7. The receiver is arranged above the tank 3 and the vertical distance between the top of the receiver into which the pipe 8 opens and the level of the liquid in the tank 3 is preferably equivalent to approximately 85% of the barometric column for any given location, although this distance may be varied if desired. The solution is caused to flow upward through the pipe 8 by the reduction of pressure in the receiver. The solution, after being subjected to the vacuum in the receiver, is discharged therefrom through the pipe 9 connected to the bottom thereof. The downward extension of the pipe 9 below the receiver is such, according to barometric conditions, that the solution will discharge freely from the receiver in spite of the vacuum therein. The discharge of solution from the receiver may be assisted by a pump 12 interposed in the pipe 9, but ordinarily the solution will flow freely from the receiver into the precipitating boxes; or, where a powdered precipitant is used, to the suction of a pump used to force the mixture of solution and precipitant through a filter press. With the exhaustion of the air from the receiver, the unbalanced pressure of the atmosphere on the solution in the steady-head tank forces the solution through the pipe 8 into the receiver, whence it is discharged through the pipe 9. The air is exhausted from the receiver by a vacuum pump 13, which is connected with a stand-pipe 14 inserted into the top of the receiver. The function of the stand-pipe is to prevent any solution from being drawn out of the receiver by the vacuum pump. A portion of the stand-pipe is of enlarged cross-section, so that water vapor is condensed and returned to the receiver. As the untreated solution passes into the receiver, it is subjected to the action of the vacuum therein and such gases as are entrained and/or dissolved in the solution are removed therefrom.

The removal of the entrained and/or dissolved gases from the solution is facilitated and rendered substantially complete by spreading the solution into films of extreme tenuity. For the purpose of spreading the solution out over a comparatively large area prior to its being divided into thin films there is provided in the form of the invention shown in Figs. 1 and 4, a perforated, flattened cone or baffle plate 11 located below the opening by which the pipe 8 discharges into the top of the receiver. The solution as spread out over the comparatively large area by the cone 11 is divided into the requisite degree of tenuity by a frame-work or checker-work 15 located beneath the cone 11 and composed of layers of spaced wooden bars 16 arranged alternately, with the bars in one layer preferably at right angles to the bars in the adjacent layers. The solution flows or trickles down over the surface of the checker-work and is thereby divided into thin, tenuous films, thus presenting the solution in such form that the surface tension of the films is most easily ruptured and thus the liquid is most effectively exposed to the action of the vacuum in the receiver and consequently the gases entrained therein are substantially or practically all removed. The checker-work 15 is supported in the receiver by the channel irons 17 attached to the receiver walls.

Instead of causing the solution to flow over the flattened cone 11 before it passes through the checker-work 15, the solution may be discharged from the pipe 8 on to a revolving cone provided with upright fins so as to thereby spread the solution over a large area before it descends through the checker-work. This form of the invention is shown in Fig. 6, where the revolving head or cone is indicated at 41 and is provided with fins 42. The head 41 is secured to the lower end of a vertically arranged and constantly driven shaft 43. As the solution is discharged from the pipe 8 and strikes the revolving head 41, it is broken up into droplets and distributed over the upper surface of the checker-work.

To prevent the receiver from becoming excessively charged with solution, improved means are provided for controlling the flow of the solution into the receiver. The means for controlling the amount of solution passing into the receiver incidentally controls the flow of the solution through the apparatus. The most effective removal of the dissolved gases from the solution requires that the vacuum in the vacuum chamber or receiver be maintained at the highest point obtainable, and at the same time that the solution be brought into intimate contact with the vacuum by splitting it up into tenuous films. The controlling means is so constructed that it does not interfere either with the maintenance of the maximum obtainable vacuum or with the division of the solution into films. This is a feature of importance in the present invention.

This means for controlling the passage of the solution into the receiver comprises a float 18 arranged within the receiver below the checker-work (Figs. 3 and 4). The float 18 is provided with an arm 19 which is secured to one end of a shaft 21 extending through a stuffing box 22 fitted into the wall of the receiver. On the outer end of the shaft 21 is a balanced lever 23 which is connected by a rod 24 with the arm 25 of the disc of a butterfly valve 26 located in the feed-pipe 8. The float, being controlled by the level of the solution in the receiver, operates to vary the feed of the solution through the pipe 8, so that the level of the solution in the receiver remains substantially constant.

In order that the disc of the valve 26 may be subjected to as little pressure as possible, so that it may be easily operated by the float 18, the valve 26 is arranged adjacent or slightly below the point in the feed-pipe 8 at which there is just sufficient pressure to feed the solution through the pipe. This is at substantially the point where the pressure in the pipe is neutral, that is, the point where the pressure in the pipe is substantially the same as the atmospheric pressure without the pipe. At this point the valve disc is subjected to such slight pressure that it may be readily moved by the action of the float 18 to control the flow of solution through the pipe. In the construction shown in Fig. 1 the point of neutral pressure is substantially on the plane of the surface of the solution in the steady-head tank. Above this point the feed-pipe is subjected to increasing negative pressures upwardly due to the exhaustion of the air from the receiver. Ingress of air into the pipe through the valve stem joint is prevented by locating the valve slightly below neutral pressure.

To prevent air at atmospheric pressure from entering into the receiver through the stuffing box 22, the end of the shaft 21 is submerged in solution contained in a box or trough 27 secured to the stuffing box, as shown in Figs. 3 and 5. The box 27 is kept filled with solution, the level of the solution in the box being constantly above the shaft 21 so that the joint between the shaft and the stuffing box is thereby sealed. At the point where the balanced lever 23 is secured to the outer end of the shaft 21, the lever is provided with a short upright arm so as to raise the horizontal part of the lever above the box 27, as shown in Fig. 5. It is thus seen that the means provided by the present invention for controlling the passage of solution into the receiver, and so through the apparatus, performs its functions without lessening the vacuum in the receiver.

In the form of the invention shown in Fig. 2, the steady-head tank is eliminated and the solution is raised from the stock tank to the receiver by a pump 32 which develops sufficient pressure to raise the solution part way into the feed-pipe 8. The solution is raised the remaining distance by the reduction of pressure within the receiver. It is thus seen that the solution is raised part way in the feed-pipe 8 by the positive pressure developed by the pump and is raised the remaining distance to the receiver inlet by the effect of the negative pressure caused by the vacuum in the receiver. In this form of the invention, the valve 26 for controlling the flow of the solution into the receiver is arranged adjacent the point of atmospheric pressure so that large volumes of solution passing through the feed-pipe into the receiver are effectively controlled by the float 18.

After the gases have been effectively removed from the solution by reason of the fact that the solution is divided into thin films while it is being subjected to the vacuum in the receiver, the solution is then brought into contact with a precipitant, which may be either in the form of a powder or dust, such as zinc dust, or in the form of shavings, such as zinc shavings. When zinc dust is employed as the precipitant, it is introduced into the pipe 9 before it passes into the pump 12. The pump 12 then forces the mixture of solution and precipitant, without contact with the air and preferably without rest, to a filter. The precipitant is introduced into the discharge pipe 9 without admitting any air to the pipe. Arranged at a suitable distance above the pipe is a hopper 33, which is connected with the pipe 9 by the precipitant feeding pipe 34. A mixture of zinc dust and solution is fed into the hopper from a zinc dust feeder 35 and the pipe 36, so that an emulsion of zinc dust is produced in the hopper. The discharge of the emulsion from the hopper is controlled by a valve 37 connected with a float 38, so that when the level of the emulsion drops to a predetermined point the valve closes the outlet and thereby prevents air from passing into the pipe 34.

When zinc shavings are employed as a precipitant, the solution from which substantially all the entrained and/or dissolved gases have been removed may be piped directly from the receiver to the head compartment 47 of the precipitation boxes 48, as shown in Fig. 2. The discharge pipe 9 in this case is connected with a header or manifold 49 having a plurality of outlet pipes 51 which are submerged in the solution in the head compartment of the precipitation box to form a seal and prevent ingress of the air and to avoid agitation of the solution, since such agitation of the surface of the solution aids in the reabsorption of the oxidizing gases.

It will be recognized that the forms of apparatus described above efficiently remove substantially the whole of any entrained and/or dissolved gases which may be in the solution or other liquid being treated. It will be understood, however, that the invention is not to be restricted to the precise forms shown and described, but may be embodied in other forms within the scope of the following claims.

Having thus described the invention and pointed out its salient features, what I claim as new is:—

1. An apparatus for removing gases from liquids, comprising a receiver, means for producing a vacuum in the receiver, a pipe for conducting liquid to the receiver, a valve in said pipe adjacent the point of neutral pressure therein, and means controlled by the level of the liquid in the receiver for operating the valve.

2. An apparatus for removing gases from liquids, comprising a receiver, means for producing a vacuum in the receiver, a tank for containing liquid located below the receiver, a feed-pipe connecting the tank with the receiver, a valve in said pipe at substantially the point of neutral pressure therein, and means controlled by the level of the liquid in the receiver for operating the valve.

3. An apparatus for removing gases from liquids comprising a receiver, means for producing a vacuum in the receiver, a pipe for conducting liquid to the receiver, a valve in said pipe at substantially the point of neutral pressure therein, a float in the receiver controlled by the level of the liquid therein for operating a valve, and means for dividing the incoming stream of liquid into minute subdivisions through which the liquid passes before it reaches the part of the receiver in which the float is located.

4. An apparatus for removing gases from liquids comprising a receiver, means for producing a vacuum in the receiver, a pipe for conducting liquid to the receiver and opening into the top thereof, a float in the receiver controlled by the level of the liquid therein, a valve located at substantially the point of neutral pressure in the feed pipe, connections between the float and the valve, and a checker-work within the receiver under the opening of the feed pipe and over the part of the receiver in which the float is located for dividing the incoming stream of liquid into fine sub-divisions.

LOUIS D. MILLS.